United States Patent
Bass et al.

(10) Patent No.: US 10,224,120 B2
(45) Date of Patent: Mar. 5, 2019

(54) NUCLEAR REACTOR SCRAM CONTROL SYSTEM

(71) Applicants: John Robert Bass, Wilmington, NC (US); Ted Gordon Bahensky, Union, NE (US); Sean Wilson Miers, Wilmington, NC (US); Robert A. Ayer, Wilmington, NC (US)

(72) Inventors: John Robert Bass, Wilmington, NC (US); Ted Gordon Bahensky, Union, NE (US); Sean Wilson Miers, Wilmington, NC (US); Robert A. Ayer, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 350 days.

(21) Appl. No.: 14/960,769

(22) Filed: Dec. 7, 2015

(65) Prior Publication Data

US 2017/0162279 A1 Jun. 8, 2017

(51) Int. Cl.
*G21C 7/16* (2006.01)
*G21C 7/36* (2006.01)
(Continued)

(52) U.S. Cl.
CPC ............ *G21C 7/16* (2013.01); *F16K 37/0041* (2013.01); *G21C 7/36* (2013.01); *G21C 9/02* (2013.01);
(Continued)

(58) Field of Classification Search
CPC .... G21C 7/00; G21C 7/06; G21C 7/08; F16K 37/0041
See application file for complete search history.

(56) References Cited

U.S. PATENT DOCUMENTS

| 3,789,876 A | 2/1974 | Kempton et al. |
| 4,129,141 A | 12/1978 | Vogeli |

(Continued)

FOREIGN PATENT DOCUMENTS

| JP | S5729870 A | 2/1982 |
| JP | S58182590 A | 10/1983 |

(Continued)

OTHER PUBLICATIONS

EP Search Report issued for corresponding EP Application No. 16201071.4 dated Apr. 10, 2017.

*Primary Examiner* — Lily C Garner
(74) *Attorney, Agent, or Firm* — Harness, Dickey & Pierce, P.L.C.

(57) ABSTRACT

A nuclear reactor scram control system for a nuclear reactor includes a solenoid pilot valve (SSPV). The SSPV includes a solenoid indicator light electrically coupled to an SSPV solenoid of the SSPV. The solenoid indicator light may be selectively activated based on an energization state of the SSPV solenoid, thereby providing an immediate and visually observable indication of the SSPV energization state. The immediate and visually observable indication of the SSPV energization state may enable quicker and more reliable verification of SSPV solenoid energization state. As a result, operator radiation exposure associated with verification may be reduced, and a risk of inadvertent nuclear reactor scram based on a de-energized SSPV solenoid may be reduced, thus streamlined nuclear reactor operations.

15 Claims, 6 Drawing Sheets

(51) Int. Cl.
*F16K 37/00* (2006.01)
*G21C 9/02* (2006.01)
*G21C 17/10* (2006.01)
*G21D 3/06* (2006.01)

(52) U.S. Cl.
CPC .............. *G21C 17/10* (2013.01); *G21D 3/06* (2013.01); *Y02E 30/39* (2013.01)

(56) References Cited

U.S. PATENT DOCUMENTS

| | | |
|---|---|---|
| 4,219,141 A | 8/1980 | Lovy |
| 4,764,884 A * | 8/1988 | Noyori ................... B60Q 11/00 123/494 |
| 4,953,590 A | 9/1990 | Kakinuma et al. |
| 5,128,093 A | 7/1992 | Ose |
| 5,196,983 A | 3/1993 | Stumpf |
| 5,241,218 A | 8/1993 | Page |
| 5,287,087 A | 2/1994 | Jencks et al. |
| 5,764,152 A | 6/1998 | Kozleski |
| 5,784,245 A | 7/1998 | Moraghan et al. |
| 6,021,652 A | 2/2000 | Walker |
| 6,109,298 A * | 8/2000 | Kaneko ............... F15B 13/0817 137/551 |
| 2010/0294373 A1 | 11/2010 | Haller et al. |
| 2012/0305096 A1* | 12/2012 | Haller ..................... F16K 31/02 137/15.08 |

FOREIGN PATENT DOCUMENTS

| | | | |
|---|---|---|---|
| JP | 8020544 B | * | 3/1996 |
| JP | H0820544 B2 | | 3/1996 |
| JP | H10110859 A | | 4/1998 |
| KR | 20090116250 A | * | 11/2009 |

\* cited by examiner

NUCLEAR REACTOR SCRAM CONTROL SYSTEM

BACKGROUND

Field

The present disclosure relates in general to nuclear reactor scram control systems and in particular to systems and methods for enabling verification of an energization state of a solenoid included in a scram solenoid pilot valve used to initiate a scram of a nuclear reactor control rod.

Description of Related Art

Nuclear reactors included in one or more nuclear plants may include one or more sets of control rods configured to be inserted or removed from a reactor core to control the rate of nuclear reactions occurring in the reactor core. A nuclear plant may be configured to rapidly insert some or all of the control rods into a reactor core. Inserting a control rod into a reactor core may result in a rapid shutdown of the reactor core. Such a shutdown operation may be referred to as a scram, SCRAM, etc. of the nuclear reactor. A rapid insertion of a control rod into a nuclear reactor core as part of a scram of the nuclear reactor may be referred to herein as a scram of the control rod, scramming the control rod, etc.

A nuclear reactor may include equipment configured to rapidly insert one or more control rods into a nuclear reactor as part of a scram of the nuclear reactor. In some cases, a nuclear reactor includes one or more hydraulic control units (HCUs) configured to cause one or more control rods to be scrammed into a nuclear reactor as part of a scram of the nuclear reactor.

In some cases, a scram of at least one control rod is controlled by a particular solenoid valve apparatus. The solenoid valve apparatus actuates to cause the HCU to scram one or more control rods. The apparatus may include a scram solenoid pilot valve ("SSPV"). An SSPV may be configured to cause one or more corresponding HCUs to scram at least one control rod based on actuation of the SSPV. The SSPV may actuate to cause a working fluid to be introduced into the HCU. The working fluid may cause the HCU to scram at least one control rod via hydraulic force.

In some cases, an SSPV actuates based on an energization state of at least one solenoid coil ("SSPV solenoid") included in the SSPV. An SSPV may be configured to actuate in response to at least one SSPV solenoid included therein being de-energized. As a result, a scram of at least one control rod may be implemented based on a loss of electrical power to the SSPV solenoid, thereby providing fail-safe scram functionality.

SUMMARY

Various embodiments herein relate to apparatuses, systems, and methods associated with a solenoid indicator light electrically coupled to a solenoid of a scram solenoid pilot valve (SSPV). The indicator light may provide an immediate, active, and visually observable indication of an energization state of the SSPV solenoid, thereby mitigating a risk of at least partial nuclear reactor shutdowns and mitigating a radiation dosage exposure to operators engaged in verifying the energization states of one or more sets of SSPVs in a nuclear plant.

In some embodiments, a nuclear reactor scram control system includes a scram solenoid pilot valve (SSPV) and at least one solenoid indicator light. The SSPV may include at least one solenoid. The SSPV may be configured to actuate based at least in part upon an energization state of the at least one SSPV solenoid. The at least one solenoid indicator light may be electrically coupled to the at least one SSPV solenoid. The indicator light may be configured to selectively activate based at least in part upon the energization state of the at least one SSPV solenoid.

In some embodiments, the indicator light may be separate and remotely located relative to the SSPV. The indicator light may be electrically coupled to the at least one SSPV solenoid via at least one power transmission line.

In some embodiments, the nuclear reactor scram control system includes a direct current rectifier. The direct current rectifier may be configured to supply direct current (DC) electrical power to the at least one SSPV solenoid.

In some embodiments, the SSPV may include an instance of circuitry electrically coupled to the at least one SSPV solenoid. The nuclear reactor scram control system may further include at least one circuit indicator light electrically coupled to the instance circuitry. The at least one circuit indicator light may be configured to selectively activate based at least in part upon a fault state of the instance of circuitry.

In some embodiments, the instance of circuitry may include an instance of voltage reduction circuitry. The instance of voltage reduction circuitry may be configured to reduce a voltage of DC electrical power supplied to the at least one SSPV solenoid.

In some embodiments, the SSPV may include a plurality of SSPV solenoids. The SSPV may be configured to actuate based at least in part upon a common energization state of each SSPV solenoid of the plurality of SSPV solenoids. The nuclear reactor scram control system may include a plurality of indicator lights electrically coupled to separate solenoids of the plurality of SSPV solenoids. Each separate indicator light of the plurality of indicator lights may be configured to selectively activate based at least in part upon the energization state of the respective SSPV solenoid to which the separate indicator light is electrically coupled.

In some embodiments, the at least one solenoid indicator light includes a light emitting diode (LED) indicator light.

In some embodiments, a method includes configuring a scram solenoid pilot valve (SSPV) to provide a visible indication of an energization state of at least one SSPV solenoid included therein. The configuring may include electrically coupling at least one solenoid indicator light to the at least one SSPV solenoid, such that the at least one solenoid indicator light is configured to selectively activate based at least in part upon the energization state of the at least one SSPV solenoid.

In some embodiments, the indicator light may be separate and remotely located relative to the SSPV. The configuring may include electrically coupling the at least one solenoid indicator light to the at least one SSPV solenoid via at least one power transmission line.

In some embodiments, the method may include electrically coupling a direct current (DC) rectifier to the SSPV solenoid, to configure to SSPV solenoid to be energized via DC electrical power.

In some embodiments, the SSPV may include an instance of circuitry electrically coupled to the at least one SSPV solenoid. The method may include configuring the SSPV to provide a visible indication of a fault state of the instance of circuitry. The configuring may include electrically coupling at least one circuit indicator light to the instance of circuitry, to configure the at least one circuit indicator light to selectively activate based at least in part upon a fault state of the instance of circuitry.

In some embodiments, the instance of circuitry may include an instance of voltage reduction circuitry. The instance of voltage reduction circuitry may be configured to reduce a voltage of DC electrical power supplied to the at least one SSPV solenoid.

In some embodiments, the SSPV may include a plurality of SSPV solenoids. The SSPV may be configured to actuate based at least in part upon a common energization state of each solenoid of the plurality of SSPV solenoids. The configuring may further include electrically coupling a plurality of indicator lights to separate SSPV solenoids of the plurality of SSPV solenoids, to configure each separate indicator light of the plurality of indicator lights to selectively activate based at least in part upon the energization state of the respective SSPV solenoid to which the separate indicator light is electrically coupled.

In some embodiments, the at least one solenoid indicator light includes a light emitting diode (LED) indicator light.

In some embodiments, a method for operating a scram solenoid pilot valve (SSPV) may include electrically coupling an SSPV solenoid included in the SSPV to a power supply and selectively activating a solenoid indicator light electrically coupled to the SSPV solenoid. An energization state of the SSPV solenoid may be based at least in part upon electrical power received from the power supply. The SSPV may be configured to actuate based on an energization state of the SSPV solenoid. The selectively activating the solenoid indicator may be based on the energization state of the SSPV solenoid.

In some embodiments, the indicator light may be electrically coupled in parallel with the SSPV solenoid to a power supply. Selectively activating the indicator light based on an energization state of the SSPV solenoid may include deactivating the indicator light in response to the SSPV solenoid becoming de-energized.

In some embodiments, the SSPV may include an instance of circuitry electrically coupled to the SSPV solenoid. The method may include selectively activating a circuit indicator light electrically coupled to the instance of circuitry based on a fault state of the instance of circuitry.

In some embodiments, the instance of circuitry may include an instance of voltage reduction circuitry, the instance of voltage reduction circuitry configured to reduce a voltage of DC electrical power supplied to the at least one SSPV solenoid.

In some embodiments, the SSPV may include a plurality of SSPV solenoids. The SSPV may be configured to actuate based at least in part upon a common energization state of each solenoid of the plurality of SSPV solenoids. The method may include selectively activating separate indicator lights of the plurality of indicator lights based at least in part upon the respective energization states of the respective SSPV solenoid to which the separate indicator lights are electrically coupled.

In some embodiments, the at least one solenoid indicator light may include a light emitting diode (LED) indicator light.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
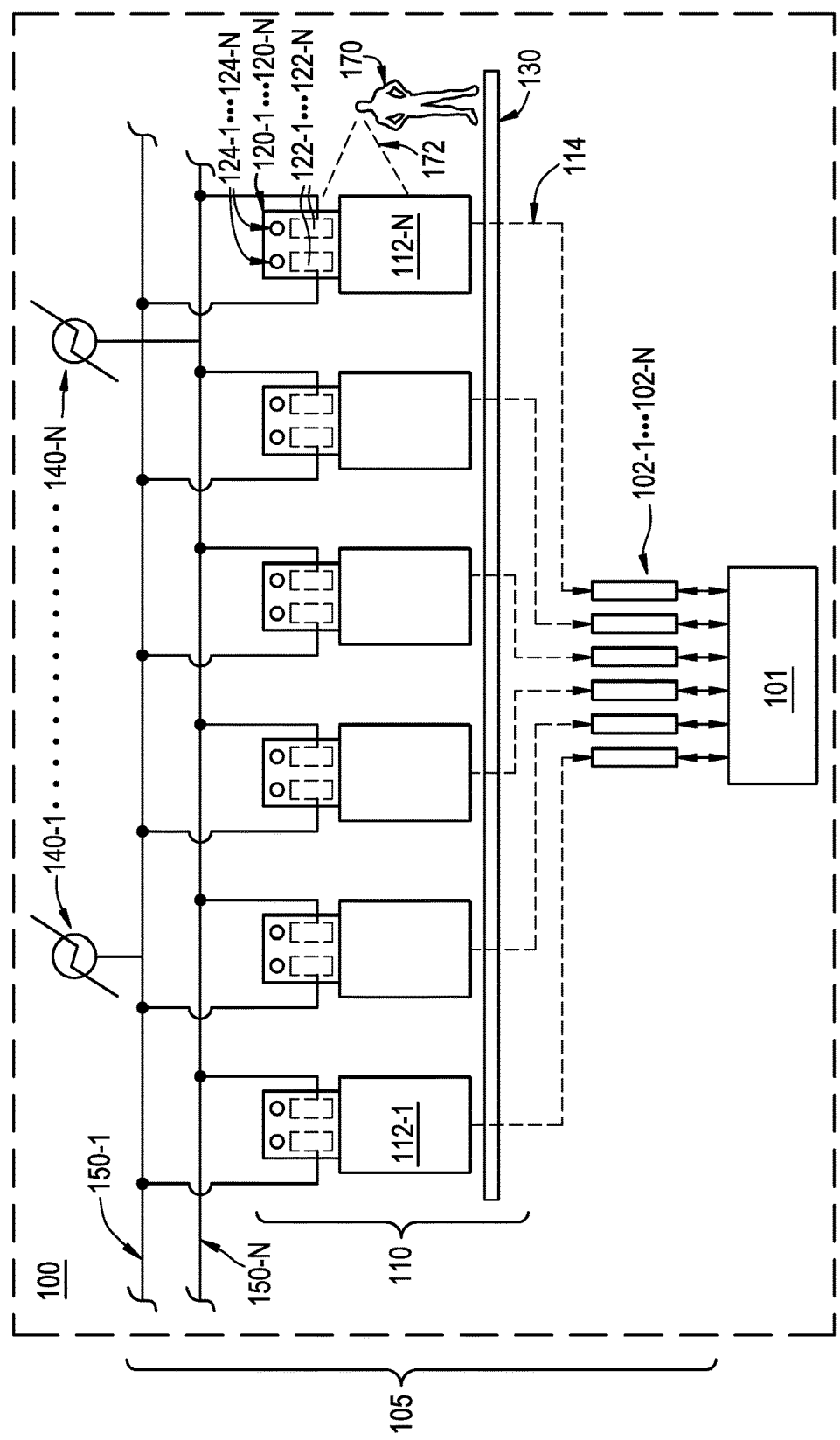
FIG. 1 is a schematic view of a nuclear reactor structure, according to some embodiments.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The present disclosure relates to unique scram solenoid pilot valves (SSPVs) that control scram operations associated with a nuclear reactor, and methods associated therewith, although example embodiments are not limited thereto.

The SSPVs described herein are unique in that they include at least one solenoid indicator light that is electrically coupled to a solenoid of the SSPV. The at least one solenoid indicator light provides an immediate, observable, and reliable indication of a present energization state of the solenoid of the SSPV. As a result, SSPV solenoid verification operations to verify SSPV solenoid energization states may be improved in reliability and reduced in duration. Improved SSPV solenoid verification reliability may mitigate a risk of inadvertent nuclear reactor scrams, thereby mitigating a risk of undesirable nuclear reactor interruptions and thus streamlining nuclear plant operations. In addition, reduced SSPV solenoid verification duration may result in improved immediacy of the verification results relative to test operations associated with the SSPVs, further mitigating a risk of undesirable nuclear reactor interruptions. Furthermore, reduced SSPV solenoid verification duration may result in reduced radiation exposure to operators conducting the verification, thereby reducing safety hazards in association with nuclear reactor operations.

FIG. 1 is a schematic view of a nuclear reactor structure 100, according to some embodiments.

Nuclear reactor structure 100 includes a nuclear reactor core 101 and a nuclear reactor scram control system 105. In some embodiments, the nuclear reactor structure 100 includes a containment structure, a portion of a nuclear plant which corresponds to an elevated-radiation region of the plant, some combination thereof, etc.

The scram control system 105 includes a set of control rods 102 configured to be inserted into the core 101 to at least partially control nuclear reactions occurring in the reactor core 101, including controlling the rate of the reactions. In some embodiments, one or more control rods 102 are configured to be reversibly inserted into the reactor core 101. A control rod 102 may be comprised of one or more various materials configured to absorb neutrons without the one or more various materials fissioning.

Nuclear reactor scram control system 105 includes a bank 110 of hydraulic control units (HCUs) 112-1 to 112-$n$. The HCUs 112-1 to 112-$n$ are each communicatively coupled 114 to one or more of the control rods 102 in the plant 100. An HCU 112 may be configured to control at least one communicatively coupled control rod 102, so that the HCU 112 is configured to at least insert the communicatively coupled control rod 102 into the reactor 101. For example, an HCU 112 may be coupled to a control rod 102 via a hydraulic line 114, so that the HCU 112 is configured to control a position of the control rod 102 by causing hydraulic force to be exerted upon at least a portion of the rod 102 via the line 114.

HCU bank 110 includes a set of scram solenoid pilot valves (SSPVs) 120-1 to 120-$n$. The SSPVs 120-1 to 120-$n$-1 to 120-$n$ are coupled to separate HCUs 112-1 to 112-$n$ in the HCU bank 110. Each SSPV 120 may be configured to cause the coupled HCU 112 to at least partially scram the at least one control rod 102 to which the coupled HCU 112 is communicatively coupled, based on actuation of the SSPV 120. For example, an SSPV 120 may, as a result of actuating, cause one or more working fluids to be introduced into the coupled HCU 112. The introduction of the one or more working fluids may result in the HCU 112 exerting a hydraulic force on at least one control rod 102. As a result, an SSPV 120 may be configured to cause at least one control rod 102 to at least partially scram into the reactor core 101 based on actuation of the SSPV 120. In some embodiments, an SSPV may, as a result of actuating, cause one or more working fluids to be evacuated from a portion of the coupled HCU 112. The introduction of the one or more working fluids may cause the HCU 112 to exert a hydraulic force on at least one control rod 102

In some embodiments, an SSPV includes at least one solenoid. The solenoid receives electrical power (i.e., is energized) from a power supply. The at least one solenoid may be referred to herein as an "SSPV solenoid." In some embodiments, the SSPV selectively actuates based on an energization state of at least one SSPV solenoid included in the SSPV. The SSPV may be configured to actuate in response to de-energization of at least one SSPV solenoid included in the SSPV. As a result, the SSPV 120 may be configured to cause at least one control rod 102 in the plant 100 to at least partially scram into the reactor core 101 based on an energization state of at least one SSPV solenoid of the SSPV 120.

In some embodiments, an SSPV includes multiple SSPV solenoids. At least two of the SSPV solenoids in an SSPV may receive power from separate power supplies. For example, as illustrated in FIG. 1, each SSPV 120 included in HCU bank 110 includes a set of multiple SSPV solenoids 122-1 to 122-*n*. Each separate SSPV solenoid 122-1 to 122-*n* included in a given SSPV 120 is electrically coupled to a separate power line 150-1 to 150-*n*. As referred to herein, a power line may include a set of one or more of any instance of known power transmission lines, including one or more instances of power cabling, one or more instances of power busses, some combination thereof, etc. The illustrated power lines 150-1 to 150-*n* are electrically coupled to power supplies 140-1 to 140-*n*. The power supplies 140-1 to 140-*n* may include separate power supplies or a common power supply.

In some embodiments, a given SSPV 120 is configured to actuate. The actuating SSPV 120 may cause at least one control rod 102 to be at least partially scrammed into reactor core 101, based on the energization states of each of the SSPV solenoids 122-1 to 122-*n* included in the SSPV 120. For example, an SSPV 120 may be configured to actuate in response to each of the SSPV solenoids 122-1 to 122-*n* being de-energized as a result of electrical power from power lines 150-1 to 150-*n* being cut to each of the solenoids 122-1 to 122-*n* in the given SSPV 120. As a result, a probability of inadvertently triggering a control rod scram may be reduced, as de-energization of only one SSPV solenoid 122 in an SSPV may result in the SSPV 120 failing to actuate.

In some cases, a limited selection of the SSPV solenoids 122-1 to 122-*n* included in an SSPV may be intentionally de-energized as part of a scram testing ("surveillance") operation to verify that the limited selection of SSPV solenoids are operating properly and will operate properly to scram at least one control rod when desired. De-energizing a limited selection of SSPV solenoids in a SSPV as part of a "partial scram surveillance" test of the SSPV, may not cause the SSPV to actuate, based on the SSPV being configured to actuate as a result of all SSPV solenoids included in the SSPV being de-energized. In some embodiments, if one of the SSPV solenoids 122-1 to 122-*n* included in an SSPV 120 is inadvertently de-energized, a partial scram surveillance test of the SSPV 120 may result in the SSPV 120 actuating. The partial scram surveillance test may include intentionally de-energizing the remaining energized SSPV solenoids 122 of the SSPV 120, causing an inadvertent ("unintentional," "undesired," etc.) scram of at least one control rod 102. Such an inadvertent scram may result in an interruption of nuclear reactor operations.

In some embodiments, a risk of inadvertent SSPV actuation may be at least partially mitigated through implementing a verification operation. The verification operation may include verifying the energization state of SSPV solenoids 122-1 to 122-*n* in SSPVs 120-1 to 120-*n*, prior to implementing various testing operations associated with the SSPVs 120-1 to 120-*n*, including a partial scram surveillance test of one or more of the SSPVs 120-1 to 120-*n*. Testing operations associated with the SSPVs 120-1 to 120-*n* may include a include testing some or all of the SSPVs 120-1 to 120-*n* in the reactor structure 100. Thus, the verification operations may include verifying whether each of the SSPV solenoids 122-1 to 122-*n* in each of the SSPVs 120-1 to 120-*n* in structure 100 are energized.

Such a verification operation may include inspecting a set of fuses associated with the set of SSPVs 120-1 to 120-*n* to determine whether any fuses are tripped, as a tripped fuse associated with an SSPV solenoid may indicate that the corresponding SSPV solenoid is de-energized. Fuse inspection may include an operator 170 entering a region of the nuclear reactor structure 100 in which a set of fuses associated with the SSPVs 120-1 to 120-*n* are located and manually inspecting the fuses for visual indications that any of the fuses are tripped.

However, such a verification operation may require extended presence by an operator in the nuclear reactor structure 100. The verification operation may, for example, include manual visual inspection 172, by the operator 170, of a large quantity of fuses associated with the SSPVs 120-1 to 120-*n*. As a result, the operator may receive an elevated dose of radiation exposure as a result of the operator's extended presence within structure 100.

In addition, a tripped fuse may be difficult to manually distinguish from a non-tripped fuse, as a tripped fuse may provide limited visual indication of having tripped. Furthermore, an extended time duration of a verification operation which includes fuse inspection may result in the operation being implemented substantially prior to a test operation. As a result, a fuse trip occurring subsequent to the verification operation and prior to the test operation may go undetected, thereby increasing a risk of inadvertent nuclear reactor interruption.

In some embodiments, SSPV solenoid verification operations may include monitoring a set of SSPVs 120-1 to 120-*n* via thermographic scans of the SSPVs 120-1 to 120-*n* to determine energization states of SSPV solenoids included in the SSPVs based on observing thermographic images of the SSPV solenoids 122-1 to 122-*n*. An energized SSPV solenoid 122-1 to 122-*n* may generate more heat than a de-energized SSPV solenoid 122-1 to 122-*n*, such that a de-energized SSPV solenoid may be distinguishable from an energized SSPV solenoid in a thermographic image.

However, such verification may require extended presence by an operator 170 in the nuclear reactor structure 100. For example, the verification may include manual operation of a thermographic sensor device by an operator 170 in a portion 130 of the reactor structure 100 in physical proximity to the set of SSPVs 120-1 to 120-*n*. As a result, the operator 170 may receive an elevated dose of radiation exposure as a result of the operator's extended presence within structure 100.

Furthermore, an extended time duration of a verification operation which includes thermographic scanning may result in the operation being implemented substantially prior to a test operation. A SSPV solenoid de-energization occurring subsequent to the thermographic scanning and prior to the test may go undetected, thereby increasing a risk of inadvertent nuclear reactor interruption.

In some embodiments, an SSPV includes one or more indicator lights electrically coupled to separate SSPV solenoids of the one or more SSPV solenoids included in the SSPV. Such indicator lights may be referred to herein as solenoid indicator lights.

A solenoid indicator light may be configured to be selectively activated based on an energization state of the SSPV solenoid to which it is electrically coupled. For example, where an SSPV solenoid is receiving electrical power from a power supply and is energized, an electrically coupled solenoid indicator light may be activated in response. In another example, where electrical power to the SSPV solenoid is terminated, such that the SSPV solenoid is de-energized, the electrically coupled solenoid indicator light may be deactivated in response. As a result, the solenoid indicator light may be configured to provide an indication of an energization state of the electrically-coupled SSPV solenoid, where the indication is at least one of immediate, active, and visually observable.

In some embodiments, an SSPV which includes multiple SSPV solenoids may include multiple solenoid indicator lights, where the separate solenoid indicator lights are electrically coupled to separate, corresponding SSPV solenoids included in the SSPV. As shown in FIG. 1, each SSPV 120 includes a set of solenoid indicator lights 124-1 to 124-$n$, where each separate solenoid indicator light 124-1 to 124-$n$ included in a given SSPV 120 is electrically coupled to a separate, respective SSPV solenoid 122-1 to 122-$n$ of the given SSPV 120.

In some embodiments, the solenoid indicator lights 124 provide at least one of an immediate, active, and visually observable indication of the energization states of the SSPV solenoids 122-1 to 122-$n$ included in the SSPVs 120-1 to 120-$n$ of HCU bank 110. For example, as shown in FIG. 1, the lights 124 may be visually observable by an operator 170 who traverses a portion 130 of the nuclear reactor structure 100 in which the SSPVs 120-1 to 120-$n$ are located. As shown, the indicator lights 124 may be located within a field of vision 172 of an operator 170 traversing the portion 130. The portion 130 may include a space, aisle, etc. which extends along at least one side of at least one portion of the HCU bank 110.

The operator 170 may, as a result of viewing one or more of the indicator lights 124 within the field of vision 172 of the operator 170, observe whether one or more of the lights 124 are activated or deactivated. The operator 170 may determine, based upon observing whether a given light 124 is activated or deactivated, whether a corresponding SSPV solenoid 122 to which the light 124 is coupled is energized or is de-energized. As a result, a verification operation to verify the SSPV solenoid 122 energization states may be simplified and improved in reliability and verification operation duration.

Figure 2:
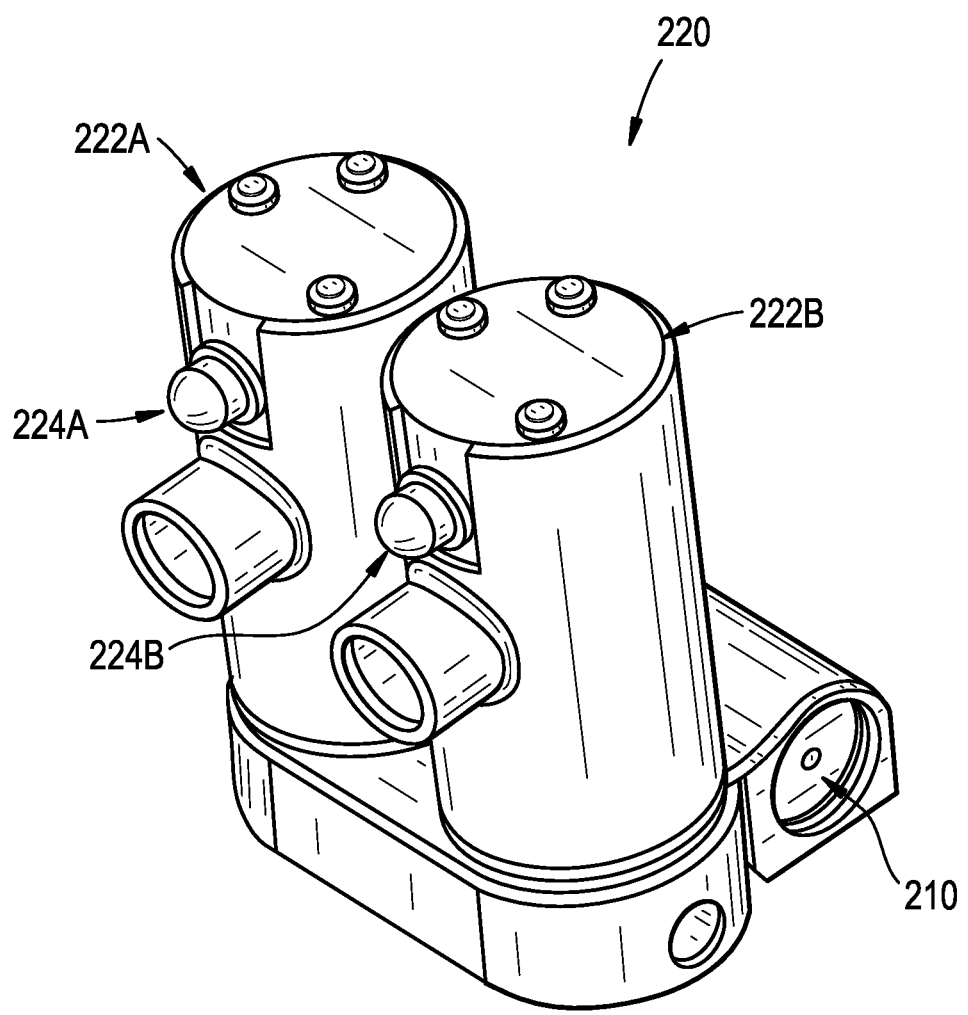
FIG. 2 is a perspective view of a scram solenoid pilot valve, according to some embodiments.

FIG. 2 is a perspective view of a scram solenoid pilot valve, according to some embodiments. The SSPV shown in FIG. 2 may be included in any of the embodiments herein, including one or more of the SSPVs 120-1 to 120-$n$ illustrated in FIG. 1.

The SSPV 220 shown in FIG. 2 includes a set of two SSPV solenoid housings 222A-B. Each separate housing 222 includes at least one separate SSPV solenoid. The SSPV 220 further includes a fluid orifice 210 configured to be coupled with a fluid conduit. One or more working fluids, may pass between the SSPV 220 and an external fluid conduit coupled to the orifice 210. The one or more working fluids may include one or more of a hydraulic fluid, gas, liquid, etc. It will be understood that an additional fluid orifice 210 may be located at another location on the SSPV 220. In some embodiments, the SSPV 220 is configured to selectively actuate, thus selectively passing one or more fluids between at least two orifices 210 of the SSPV 220 via an internal fluid conduit (not shown in FIG. 2), based on each of the SSPV solenoids included in housings 222A-B being at a common energization state. The common energization state may include each of the SSPV solenoids included in housings 222A-B being de-energized.

SSPV 220 includes a set of solenoid indicator lights 224A-B coupled to electrical interfaces of separate solenoid housings 222A-B. Each indicator light 224A-B may be electrically coupled to a separate set of one or more SSPV solenoids included in the respective housing 222A-B to which the indicator light 224 is coupled. Each indicator light 224 may be configured to be selectively activated based on an energization state of one or more SSPV solenoids included in the respective housing 222 to which the indicator light 224 is coupled. In some embodiments, one or more of the indicator lights 224 includes one or more light emitting diodes (LEDs).

Figure 3:
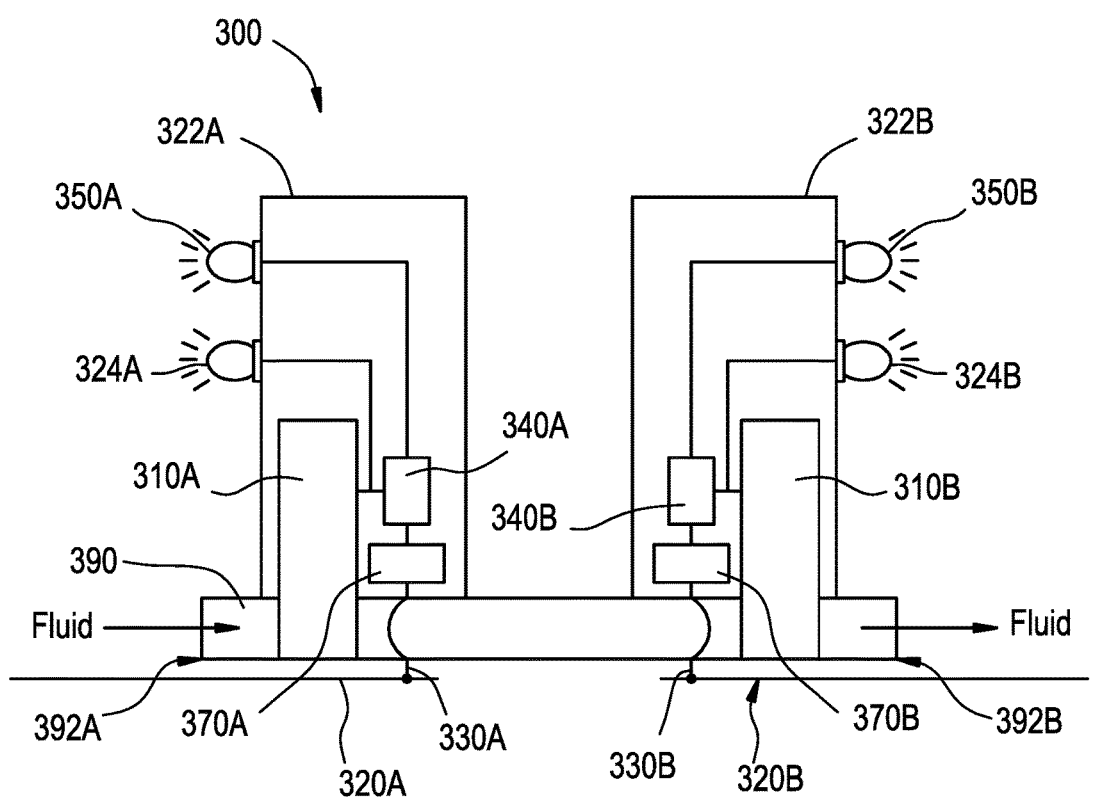
FIG. 3 is a schematic cross-section view of a scram solenoid pilot valve, according to some embodiments.

FIG. 3 is a schematic view of a scram solenoid pilot valve, according to some embodiments. The SSPV shown in FIG. 3 may be included in any of the embodiments herein, including one or more of the SSPVs 120-1 to 120-$n$ illustrated in FIG. 1.

In some embodiments, SSPV 300 includes a fluid conduit 390 bounded by separate fluid orifices 392A-B. The SSPV 300 is configured to selectively actuate to permit one or more working fluids to flow through the conduit 390 between the separate orifices 392A-B.

In some embodiments, SSPV 300 includes one or more SSPV solenoids 310A-B. The one or more SSPV solenoids 310A-B may be collectively configured to cause the SSPV 300 to actuate based on an energization state of the one or more SSPV solenoids 310A-B. In some embodiments, an SSPV solenoid causes the SSPV to actuate based at least in part upon the SSPV being energized. In some embodiments, an SSPV solenoid causes the SSPV to actuate based at least in part upon the SSPV being de-energized.

The illustrated SSPV 300 included in FIG. 3 includes two separate SSPV solenoids 310 in separate solenoid housings 322. The separate solenoids 310A-B are each configured to selectively open or close at least a portion of a flow path through the conduit 390 based on an energization state of the respective solenoids 310A-B. In some embodiments, the SSPV solenoids 310A-B are each configured to open a flow path through at least a portion of the conduit 390 based on the respective SSPV solenoids 310A-B having a common energization state. A common energization state may include the SSPV solenoids 310A-B either being each energized or each de-energized. As a result, the SSPV 300 may be configured to actuate based on the respective SSPV solenoids 310A-B having a common energization state. For example, as described herein, an SSPV may be configured to actuate based on each of the SSPV solenoids included therein being de-energized.

The SSPV 300 includes a set of power terminals 330A-B, and the separate solenoids 310A-B are each electrically coupled to a separate power terminal 330A-B. In some embodiments, the separate power terminals 330A-B are configured to be coupled to separate power lines. As a result, the separate SSPV solenoids 310A-B may be electrically coupled to separate power supplies supplying power to the separate power lines. In the illustrated embodiment, for example, each terminal 330A-B is coupled to a separate power line 320A-B, and each separate power line 320A-B may receive power from a separate power supply. As a result, a loss of electrical power in one of the power lines 320A-B may result in de-energization of one SSPV solenoid 310 but not the other solenoid coupled to the other power line 320. In some embodiments, where one of the solenoids 310 is inadvertently de-energized, an intentional termination of electrical power to the other SSPV solenoid 310 may result in the SSPV 300 inadvertently being caused to actuate.

In some embodiments, one or more SSPV solenoids included in an SSPV are configured to receive alternating-current (AC) electrical power and are thus configured to be energized or de-energized based on a supply of AC power. In some embodiments, one or more SSPV solenoids included in an SSPV are configured to receive direct-current (DC) electrical power and are thus configured to be energized or de-energized based on a supply of DC power.

In some embodiments, an SSPV is configured to convert received electrical power between DC and AC electrical power. In the illustrated embodiment, for example, SSPV 300 includes rectifier devices 370A-B. The rectifier devices may each be coupled in series with a separate SSPV solenoid 310A-B to a separate power terminal 330A-B. Each power terminal 330A-B may be configured to electrically couple to, and receive electrical power from, an AC power supply via one or more power lines 320. Each rectifier 370 may be configured to convert AC electrical power received at a coupled terminal 330 to DC power and to further supply at least a portion of the converted DC power to the SSPV solenoid 310 to which the rectifier 370 is coupled in series.

SSPV 300 includes a set of solenoid indicator lights 324A-B. The solenoid indicator lights 324A-B are each physically coupled to a separate electrical interface. The separate electrical interfaces are electrically coupled to separate SSPV solenoids 310A-B and thereby results in each separate solenoid indicator light 324A-B being electrically coupled to a separate SSPV solenoid 310A-B.

In the illustrated embodiment, each light 324A-B is electrically coupled in parallel with a separate SSPV solenoid 310A-B to a separate power terminal 330A-B. In some embodiments, a solenoid indicator light 324 may be coupled in series with an SSPV solenoid 310 to a separate power terminal 330A-B.

In the illustrated embodiment, the SSPV 300 may be configured to selectively activate at least one solenoid indicator light 324A-B based on an energization state of the respective electrically coupled SSPV solenoid 310A-B, where the light 324 is activated in response to the electrically coupled SSPV solenoid 310 being energized and may be deactivated in response to the electrically coupled SSPV solenoid 310 being de-energized. In some embodiments, the SSPV 300 is configured to activate a given solenoid indicator light 324 in response to the electrically coupled SSPV solenoid 310 being de-energized and deactivate the solenoid indicator light 324 in response to the electrically coupled SSPV solenoid 310 being energized. In some embodiments, a solenoid indicator light emits light at a certain color in response to the electrically coupled SSPV solenoid 310 being energized and emits light at a different color temperature in response to the electrically coupled SSPV solenoid 310 being de-energized.

In the illustrated embodiment, a given solenoid indicator light 324A-B may be configured to selectively activate based on an energization state of the respective electrically coupled SSPV solenoid 310A-B, where the light 324 is activated in response to the electrically coupled SSPV solenoid 310 being energized and is deactivated in response to the electrically coupled SSPV solenoid 310 being de-energized. In some embodiments, a given solenoid indicator light 324A-B may be configured to activate in response to the electrically coupled SSPV solenoid 310 being de-energized and deactivate in response to the electrically coupled SSPV solenoid 310 being energized. In some embodiments, a solenoid indicator light emits light at a certain color in response to the electrically coupled SSPV solenoid 310 being energized and emits light at a different color temperature in response to the electrically coupled SSPV solenoid 310 being de-energized.

In some embodiments, an SSPV includes one or more instances of circuitry that are associated with one or more operations of the SSPV. In some embodiments, an instance of circuitry includes a monitoring circuit configured to generate information associated with one or more portions of the SSPV and causes the information to be transmitted to a receiver. In some embodiments, an instance of circuitry includes a control circuit configured to selectively control a supply of electrical power to an SSPV solenoid based on control signals received from a remote source. In some embodiments, an instance of circuitry includes a voltage reduction circuit configured to reduce a voltage of electrical power supplied to an SSPV solenoid.

In the illustrated embodiment, SSPV 300 includes a set of voltage reduction circuits 340A-B that are coupled in series with separate SSPV solenoids 310A-B to separate power terminals 330A-B. Each voltage reduction circuit 340 comprises an instance of circuitry configured to receive electrical power supplied from a separate power terminal 330. The instance of circuitry may supply the power, at a reduced voltage relative to a voltage at which the electrical power is received at the respective circuit 340, to a separate SSPV solenoid 310. A voltage reduction circuit may provide a benefit of mitigating a risk of damage to an SSPV solenoid as a result of excessive voltage of received electrical power.

In some embodiments, an SSPV includes a circuit indicator light electrically coupled to at least one instance of circuitry included in the SSPV, via an electrical interface. For example, the illustrated SSPV 300 includes a set of circuit indicator lights 350A-B electrically coupled, via separate electrical interfaces, to separate instances of circuitry 340A-B coupled to separate SSPV solenoids 310A-B. An instance of circuitry 340 may be configured to selectively activate the electrically coupled circuit indicator light 350 based on a fault state ("failure state") of the instance of circuitry 340.

For example, where an instance of circuitry 340 includes a voltage reduction circuit, the SSPV 300 may be configured to activate the coupled indicator light 350 in response to a fault in the instance of circuitry 340. The fault may result in an increase in the voltage of the electrical power supplied from the instance of circuitry 340 to the coupled SSPV 310.

In the illustrated embodiment, each instance of circuitry 340 is configured to selectively activate the respective electrically coupled circuit indicator light 350A-B based on a fault state of the respective instance of circuitry 340A-B, where each instance of circuitry 340 is configured to selectively activate an electrically coupled light 350 in response to an at least partial failure of the respective instance of circuitry 340A-B and is further configured to deactivate the electrically coupled light 350 in response to an absence of an at least partial failure of the respective electrically coupled instance of circuitry 340A-B.

In some embodiments, a circuit indicator light 350 is configured to be deactivated in response to an at least partial failure of an electrically coupled instance of circuitry 340 and is further configured to be activated in response to an absence of an at least partial failure of the electrically coupled instance of circuitry 340A-B. In some embodiments, a circuit indicator light is configured to emit light at a certain color in response to an at least partial failure of the electrically coupled instance of circuitry 340 and is further configured to emit light at a different color in response to an absence of an at least partial failure of the electrically coupled instance of circuitry 340. As referred to herein, an at least partial failure of an instance of circuitry may include an occurrence of one or more faults at the instance of circuitry.

Figure 4:
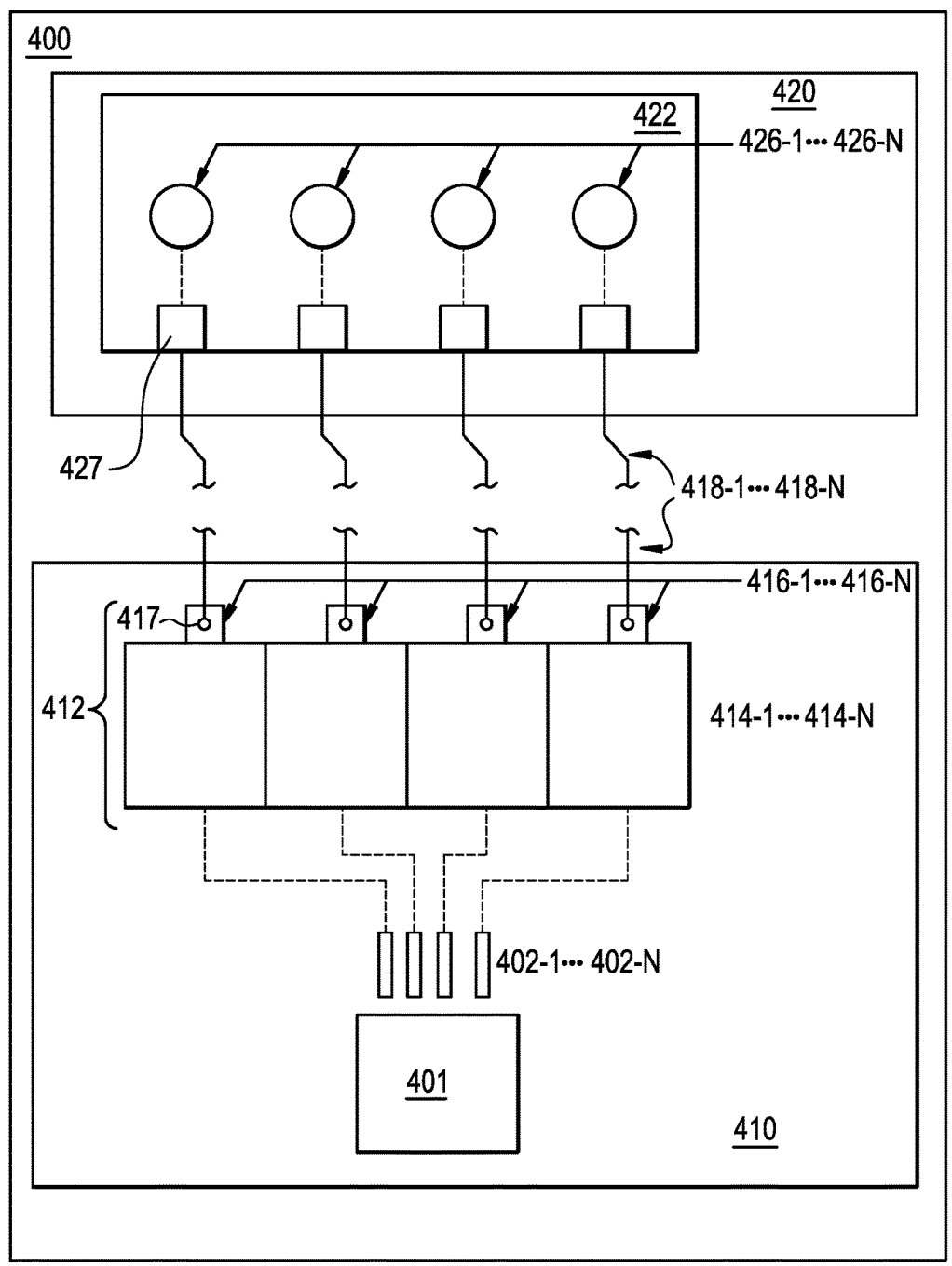
FIG. 4 is a schematic diagram of a nuclear reactor scram control system, according to some embodiments.

FIG. 4 is a schematic diagram of a nuclear reactor scram control system 400, according to some embodiments. The system 400 includes one or more SSPVs 416-1 to 416-n. The one or more SSPVs 416-1 to 416-n may include any embodiment of SSPVs included herein.

In some embodiments, a solenoid indicator light electrically coupled to a SSPV solenoid included in an SSPV is located external to the SSPV. The solenoid indicator light may be remotely located from the SSPV and may be electrically coupled to the SSPV via one or more power transmission lines, electrical interfaces, outlets, etc. between the solenoid indicator light and the SSPV solenoid. As a result, the solenoid indicator light may provide at least one of an immediate, active, and visually observable indication of an energization state of an SSPV solenoid to an operator who is located remotely from the SSPV. Providing such indication may enable SSPV solenoid energization state monitoring in association with reduced radiation exposure to the operator, as the remotely-located solenoid indicator light may be positioned further from a nuclear reactor core relative to the SSPV to which the solenoid indicator light is electrically coupled.

The system 400 illustrated in FIG. 4 includes a nuclear reactor structure 410. The nuclear reactor structure 410 includes a nuclear reactor core 401, a set of control rods 402-1 to 402-*n*, and a bank 412 of HCUs 414-1 to 414-*n* configured to control scramming of one or more of the control rods 402-1 to 402-*n*. The HCU bank 412 may include a set of HCUs 414-1 to 414-*n* and a corresponding respective set of SSPVs 416-1 to 416-*n*, where each SSPV 416 is coupled to a separate corresponding HCU 414 and each SSPV 416 may be configured to at least partially control the coupled HCU 414, such that each SSPV 416 may be configured to cause the coupled HCU 414 to cause a corresponding control rod 402-1 to 402-*n* to at least partially scram into the nuclear reactor 401.

As shown in FIG. 4, each SSPV 416 includes an electrical interface 417 coupled to a separate set of one or more power lines 418-1 to 418-*n*. The multiple sets of one or more power lines 418-1 to 418-*n* may extend between the SSPVs 416-1 to 416-*n* to a remote SSPV monitoring apparatus 422 located in a remote location, relative to the HCU bank 412. In some embodiments, the apparatus 422 is located in a region 420 of a nuclear plant, where the region 420 is remotely located relative to the nuclear reactor structure 410 in which at least the core 401 and HCU bank 412 are located. The region 420 may be located more distantly from the reactor 401 relative to the HCU bank 412, including a portion of the plant beyond a containment region in which the bank 410, reactor 401, and control rods 402-1 to 402-*n* are located.

Apparatus 422 may include an indicator board to which solenoid indicator lights 426-1 to 426-*n* are coupled, where the board 422 couples the indicator lights 426-1 to 426-*n* to separate corresponding electrical interfaces 427 to which separate sets of one or more power lines 418-1 to 418-*n* are coupled. As a result, each solenoid indicator light 426-1 to 426-*n* coupled to apparatus 422 may be electrically coupled to a separate SSPV solenoid included in a separate SSPV 416 from which the indicator light 426 is remotely located. Therefore, each solenoid indicator light 426 may provide a remote indication of an energization state of a separate SSPV solenoid included in the SSPVs 416-1 to 416-*n* of HCU bank 412, based on the solenoid indicator lights 426-1 to 426-*n* being electrically coupled to the SSPV solenoids via separate sets of power lines 418 and interfaces 417, 427.

Figure 5:
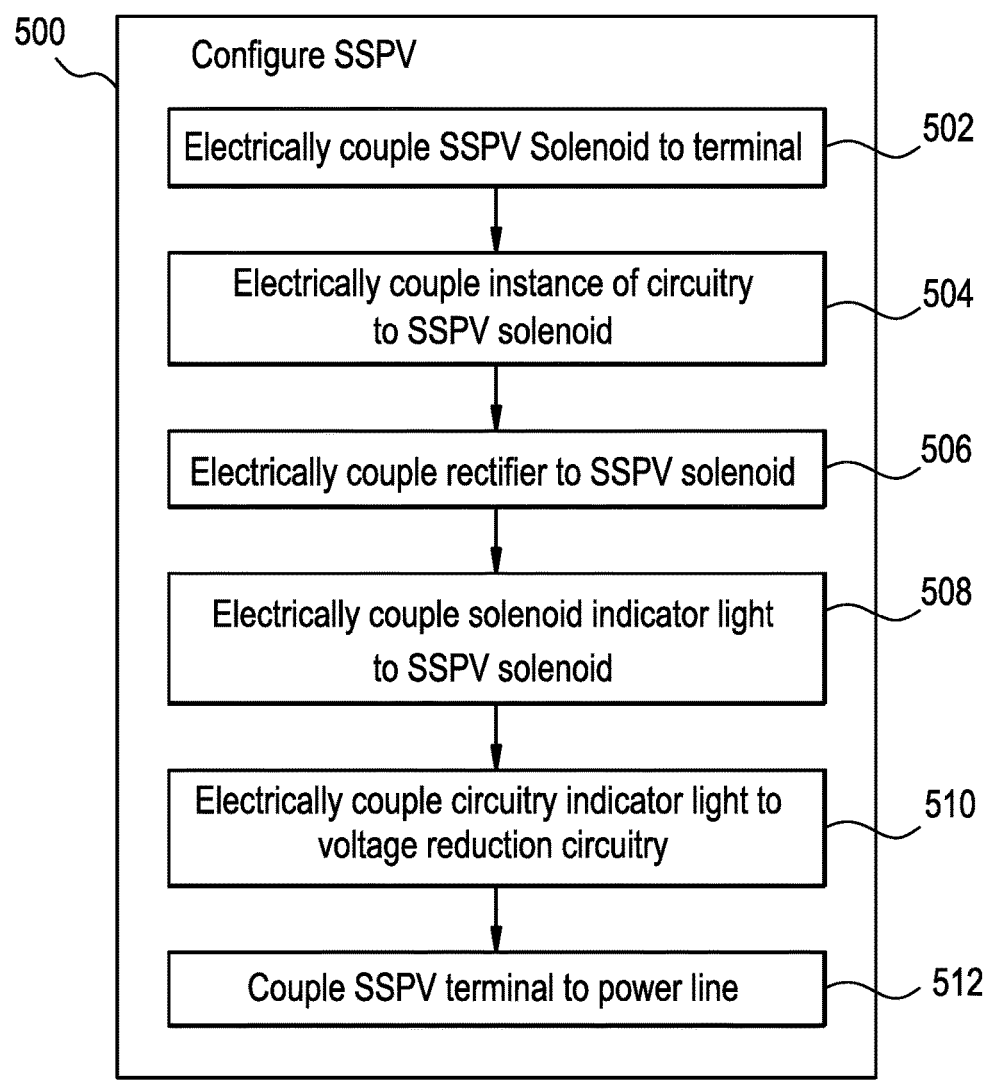
FIG. 5 illustrates configuring a scram solenoid pilot valve to provide control rod scram control and visible indication of solenoid energization state, according to some embodiments.

FIG. 5 illustrates configuring 500 a scram solenoid pilot valve (SSPV) to provide control rod scram control and visible indication of SSPV solenoid energization state, according to some embodiments. The configuring 500 may be implemented with regard to any embodiment of the SSPV included herein. In some embodiments, the configuring 500 is implemented by a human operator.

At 502, an SSPV solenoid included in the SSPV is electrically coupled to a power terminal of the SSPV. The SSPV may include multiple SSPV solenoids, and each SSPV solenoid may be electrically coupled to a separate power terminal, so that separate SSPV solenoids receive electrical power from separate power lines. The SSPV solenoid may be configured to receive DC power or AC power. At 504, an instance of circuitry is electrically coupled to the SSPV. The instance of circuitry may comprise an instance of voltage reduction circuitry, and the instance of voltage reduction circuitry may be electrically coupled to the power terminal in series with an SSPV solenoid, such that electrical power received at the power terminal is supplied to the SSPV solenoid via the instance of voltage reduction circuitry. At 506, a rectifier is electrically coupled to the power terminal in series with the SSPV solenoid, so that the rectifier is configured to convert AC power, received at the power terminal, into DC power and further supply the DC power to the SSPV solenoid.

At 508, a solenoid indicator light is electrically coupled to the SSPV solenoid. The solenoid indicator light may be electrically coupled to the SSPV via coupling with an electrical interface, including an electrical socket, included in the SSPV. The socket may be electrically coupled to the SSPV solenoid via one or more internal electrical circuits in the SSPV. The electrical socket may be electrically coupled to the power terminal in parallel with the SSPV solenoid, so that coupling the solenoid indicator light to the electrical socket includes electrically coupling the solenoid indicator light in parallel with the SSPV solenoid to the power terminal. The solenoid indicator light may be coupled in series with the SSPV solenoid. The solenoid indicator light may be configured to receive AC power or DC power. The solenoid indicator light may be, as a result of being electrically coupled to the SSPV solenoid, configured to selectively activate based on whether the SSPV solenoid is receiving electrical power (i.e., an energization state of the SSPV solenoid).

In some embodiments, the solenoid indicator light is installed in a device which is external to, and remotely located from the SSPV. For example, the solenoid indicator light may be installed in an indicator board. Electrically coupling the solenoid indicator light may include electrically coupling the solenoid indicator light to at least one power line electrically coupled to the SSPV solenoid via at least one electrical interface, so that the solenoid indicator light is electrically coupled to the SSPV solenoid via at least the at least one power line.

In some embodiments, where an instance of circuitry is included in the SSPV, a circuitry indicator light may be electrically coupled to the instance of circuitry at 510. The circuitry indicator light may be electrically coupled to the instance of circuitry in parallel or in series. The circuitry indicator light may be, as a result of being electrically coupled to the instance of circuitry, configured to selectively activate based on a fault state of the instance of circuitry.

At 512, the SSPV power terminal is electrically coupled to a power line. Electrically coupling the SSPV power terminal to the power line may configure the SSPV power terminal to supply power, received from the power line, to at least the SSPV solenoid electrically coupled to the SSPV power terminal. Electrically coupling the power terminal to the power line may further configure the SSPV power terminal to supply power, received from the power line, to one or more of a solenoid indicator light electrically coupled to the SSPV solenoid, an instance of circuitry installed in the SSPV, or a circuitry circuit indicator light.

Figure 6:
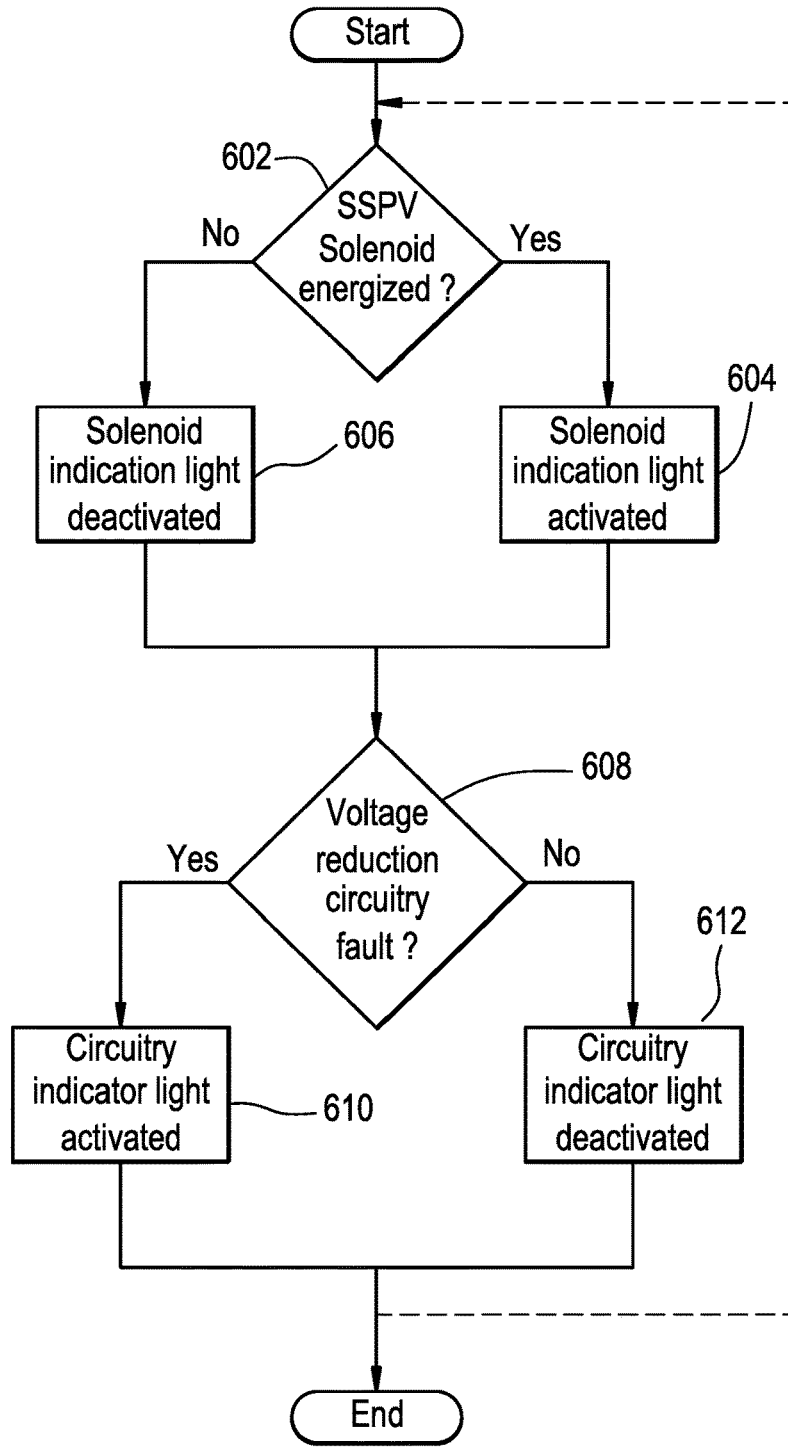
FIG. 6 illustrates operating a scram solenoid pilot valve (SSPV), according to some embodiments.

FIG. 6 illustrates operating a scram solenoid pilot valve (SSPV), according to some embodiments. The operating 600 may be implemented with regard to any embodiments of the SSPV included herein.

At 602 and 604, in response to a SSPV solenoid receiving electrical power (i.e., the solenoid is energized), the SSPV activates a solenoid indicator light. At 602 and 606, in response to the SSPV solenoid is not receiving electrical power (i.e., the solenoid is de-energized), the SSPV deactivates a solenoid indicator light. In some embodiments, the solenoid indicator light is configured to activate in response to the SSPV solenoid being de-energized and is further configured to deactivate in response to the SSPV solenoid being energized. In some embodiments, the solenoid indicator light is configured to change between different lighting modes, including changing between displaying a different color of light, based on whether the SSPV solenoid is energized or de-energized.

At 608 and 610, in response to an instance of circuitry installed in the SSPV solenoid is operating in a non-fault state (i.e., the instance of circuitry is operating normally), the SSPV activates the circuitry indicator light. At 608 and 612, in response to an occurrence of a fault at the instance of circuitry installed in the SSPV (i.e., the instance of circuitry is not operating normally, is at least partially failed, etc.), the SSPV deactivates the circuitry indicator light. In some embodiments, the fault may include an at least partial loss of power supplied to the instance of circuitry, a logical fault in the instance of circuitry, an at least partial failure of the instance of circuitry to perform at least one operation, some combination thereof, etc. In some embodiments, the instance of circuitry is configured to activate or deactivate the circuitry indicator light. The instance of circuitry may be configured to activate the circuitry circuit indicator light in response to an at least partial failure of the instance of circuitry and is further configured to deactivate in response to the instance of circuitry operating normally. In some embodiments, the circuitry circuit indicator light is configured to change between different lighting modes, including changing between displaying a different color of light, based on whether or not an at least partial failure of the instance of circuitry has occurred.

The following is a summary of the various features and advantages of the disclosed SSPV solenoid indicator light, although it should be understood that the following is not an exhaustive list. The solenoid indicator light is configured to provide an immediate, active, and visually observable indication of an energization state of an SSPV solenoid. The indication may be immediate based on the solenoid indicator light receiving power via a common power supply with the SSPV solenoid. A loss of power to the SSPV solenoid may result in a loss of power to the solenoid indicator light, thereby causing the solenoid indicator light to deactivate to provide an indication that the SSPV solenoid is de-energized. The indication may be active based on the solenoid indicator light, through the generation of light, providing a light indication in response to the indicator light receiving power in parallel with the SSPV solenoid. The indication may be visually observable based on the light generated by the indicator light. An operator observing a solenoid indicator light electrically coupled to an SSPV solenoid may be enabled to quickly determine an energization state of the SSPV solenoid based on the operator observing whether the solenoid indicator light is activated (i.e., generating light) or deactivated (i.e., extinguished). As a result, an operator is enabled to rapidly verify whether SSPV solenoids included in a set of SSPVs are de-energized by visually observing the solenoid indicator lights electrically coupled to the SSPV solenoids.

Enabling rapid verification of SSPV solenoid energization states via visual monitoring of the immediate and active indications provided by the solenoid indicator lights may enable an operator to verify that SSPV solenoids are energized more quickly than via other processes, thereby reducing the amount of time spent by the operator in proximity to SSPVs positioned proximate to a nuclear reactor, thereby resulting in reduced dosages of radiation exposure received by an operator in association with a process of verifying SSPV solenoid energization states.

In addition, enabling rapid verification of SSPV solenoid energization states via visual monitoring of the immediate and active indications provided by the solenoid indicator lights may enable the verification to be implemented just prior to implementation of tests, where such tests may include partial SSPV solenoid de-energization. As a result, a period of time between implementation of the verification and implementation of the tests may be reduced as a result of enabling rapid SSPV solenoid energization state verification, thereby reducing a probability of SSPV solenoid de-energization between completion of the verification and initiation of the tests and thus at least partially mitigating a risk of inadvertent at least partial control rod scrams cause by inadvertent actuation of an SSPV.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and may be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A nuclear reactor scram control system, comprising:
a scram solenoid pilot valve (SSPV) including a plurality of SSPV solenoids and a plurality of power terminals, the plurality of power terminals configured to be coupled to separate power supplies, the plurality of SSPV solenoids electrically coupled to separate, respective power terminals of the plurality of power terminals, each SSPV solenoid of the plurality of SSPV solenoids configured to be energized or de-energized based on whether electrical power is supplied from an electrically coupled power terminal of the plurality of power terminals to the SSPV solenoid, the SSPV configured to actuate to permit a working fluid to pass through the SSPV to cause a control rod to be inserted into a nuclear reactor core based at least in part upon whether the plurality of SSPV solenoids are commonly energized or de-energized; and
a plurality of solenoid indicator lights mounted directly to a housing of the SSPV, the plurality of solenoid indicator lights electrically coupled to separate, respective SSPV solenoids of the plurality of SSPV solenoids and the separate, respective power terminals electrically coupled to the separate, respective SSPV solenoids, such that each separate solenoid indicator light of the plurality of solenoid indicator lights is configured to selectively activate based on whether electrical power is supplied from a separate, coupled power terminal of the plurality of power terminals to a separate, coupled SSPV solenoid of the plurality of SSPV solenoids.

2. The nuclear reactor scram control system of claim 1, the SSPV further including
a direct current rectifier coupled in series with the SSPV solenoid of the plurality of SSPV solenoids to one power terminal of the plurality of power terminals that is electrically coupled to one SSPV solenoid, the direct current rectifier configured to convert AC electrical power received from one power terminal to direct current (DC) electrical power and supply the DC electrical power to the SSPV solenoid.

3. The nuclear reactor scram control system of claim 2, wherein
the SSPV includes an instance of circuitry electrically coupled to the SSPV solenoid of the plurality of SSPV solenoids, and
the nuclear reactor scram control system further includes at least one circuit indicator light mounted directly to the housing of the SSPV and electrically coupled to the instance of circuitry, the at least one circuit indicator light configured to selectively activate based at least in part upon a fault state of the instance of circuitry.

4. The nuclear reactor scram control system of claim 3, wherein the instance of circuitry includes an instance of voltage reduction circuitry, the instance of voltage reduction circuitry configured to reduce a voltage of DC electrical power supplied to the SSPV solenoid.

5. The nuclear reactor scram control system of claim 1, wherein each solenoid indicator light of the plurality of solenoid indicator lights includes at least one light emitting diode (LED).

6. A method, comprising:
configuring a scram solenoid pilot valve (SSPV) including a plurality of SSPV solenoids to provide a visible indication of an energization state of SSPV solenoid of the plurality of SSPV solenoids of the SSPV, the SSPV including a plurality of power terminals, the plurality of power terminals configured to be coupled to a separate power supplies, the plurality of SSPV solenoids electrically coupled to separate, respective power terminals of the plurality of power terminals, each SSPV solenoid of the plurality of SSPV solenoids configured to be energized or de-energized based on whether electrical power is supplied from an electrically coupled power terminal of the plurality of power terminals to the SSPV solenoid, the SSPV configured to actuate to permit a working fluid to pass through the SSPV to cause a control rod to be inserted into a nuclear reactor core based at least in part upon whether the plurality of SSPV solenoids are commonly energized or de-energized, the configuring including,
mounting a plurality of solenoid indicator lights directly to a housing of the SSPV and electrically coupling the plurality of solenoid indicator lights to separate, respective SSPV solenoids of the plurality of SSPV solenoids and the separate, respective power terminals electrically coupled to the separate, respective SSPV solenoids, such that each separate solenoid indicator light of the plurality of solenoid indicator lights is configured to selectively activate based on whether electrical power is supplied from a separate, coupled power terminal of the plurality of power terminals to a separate, coupled SSPV solenoid of the plurality of SSPV solenoids.

7. The method of claim 6, further comprising:
electrically coupling a direct current (DC) rectifier in series with the SSPV solenoid of the plurality of SSPV solenoids to one power terminal of the plurality of power terminals that is electrically coupled to the one SSPV solenoid, to configure one SSPV solenoid to be energized via DC electrical power.

8. The method of claim 7, wherein,
the SSPV includes an instance of circuitry electrically coupled to the SSPV solenoid of the plurality of SSPV solenoids; and
the method includes configuring the SSPV to provide a visible indication of a fault state of the instance of circuitry, the configuring including mounting at least one circuit indicator light directly to the housing of the SSPV and electrically coupling the at least one circuit indicator light to the instance of circuitry, such that the at least one circuit indicator light is configured to selectively activate based at least in part upon the fault state of the instance of circuitry.

9. The method of claim 8, wherein the instance of circuitry includes an instance of voltage reduction circuitry, the instance of voltage reduction circuitry configured to reduce a voltage of DC electrical power supplied to the SSPV solenoid.

10. The method of claim 6, wherein each solenoid indicator light of the plurality of solenoid indicator lights includes a light emitting diode (LED).

11. A method for operating a scram solenoid pilot valve (SSPV), the method comprising:
electrically coupling a plurality of SSPV solenoids included in the SSPV to a separate, respective power supplies of a plurality of power supplies via separate, respective power terminals of a plurality of power terminals, such that the each SSPV solenoid of the plurality of SSPV solenoids is configured to be energized or de-energized based on whether electrical power is supplied from an electrically coupled power supply of the plurality of power supplies to the SSPV solenoid via an electrically coupled power terminal of the plurality of power terminals, the SSPV is configured to actuate to permit a working fluid to pass through the SSPV to cause a control rod to be inserted into a nuclear reactor core based at least in part upon whether the plurality of SSPV solenoids are commonly energized or de-energized; and
selectively activating a solenoid indicator light of a plurality of solenoid indicator lights mounted directly to a housing of the SSPV and electrically coupled to separate, respective SSPV solenoids and separate, respective power terminals of the plurality of power terminals that are electrically coupled to the separate, respective SSPV solenoids, the selectively activating is based on whether the electrical power is supplied from a power supply of the plurality of power supplies to a SSPV solenoid of the plurality of SSPV solenoids that is electrically coupled to the solenoid indicator light.

12. The method of claim 11, wherein,
each solenoid indicator light of the plurality of solenoid indicator lights is electrically coupled in parallel with the separate SSPV solenoids of the plurality of SSPV solenoids to separate power terminals of the plurality of power terminals; and
the selectively activating the solenoid indicator light includes deactivating the solenoid indicator light in response to the SSPV solenoid becoming de-energized.

13. The method of claim 11, wherein,
the SSPV includes an instance of circuitry electrically coupled to one SSPV solenoid of the plurality of SSPV solenoids; and
the method includes selectively activating a circuit indicator light electrically coupled to the instance of circuitry based on a fault state of the instance of circuitry.

14. The method of claim 13, wherein the instance of circuitry includes an instance of voltage reduction circuitry, the instance of voltage reduction circuitry configured to reduce a voltage of DC electrical power supplied to the SSPV solenoid.

15. The method of claim 11, wherein each solenoid indicator light of the plurality of solenoid indicator lights includes a light emitting diode (LED).

* * * * *

UNITED STATES PATENT AND TRADEMARK OFFICE
CERTIFICATE OF CORRECTION

PATENT NO. : 10,224,120 B2
APPLICATION NO. : 14/960769
DATED : March 5, 2019
INVENTOR(S) : John Robert Bass et al.

It is certified that error appears in the above-identified patent and that said Letters Patent is hereby corrected as shown below:

In the Claims

Column 19, Lines 3-28, (approx.) should read:

Claim 2. The nuclear reactor scram control system of claim 1, the SSPV further including a direct current rectifier coupled in series with one SSPV solenoid of the plurality of SSPV solenoids to one power terminal of the plurality of power terminals that is electrically coupled to one SSPV solenoid, the direct current rectifier configured to convert AC electrical power received from the one power terminal to direct current (DC) electrical power and supply the DC electrical power to the SSPV solenoid.

Claim 3. The nuclear reactor scram control system of claim 2, wherein the SSPV includes an instance of circuitry electrically coupled to the one SSPV solenoid of the plurality of SSPV solenoids, and the nuclear reactor scram control system further includes at least one circuit indicator light mounted directly to the housing of the SSPV and electrically coupled to the instance of circuitry, the at least one circuit indicator light configured to selectively activate based at least in part upon a fault state of the instance of circuitry.

Claim 4. The nuclear reactor scram control system of claim 3, wherein the instance of circuitry includes an instance of voltage reduction circuitry, the instance of voltage reduction circuitry configured to reduce a voltage of DC electrical power supplied to the one SSPV solenoid.

Column 19, Line 33-Column 20, Line 66, (approx.) should read:

Claim 6. A method, comprising: configuring a scram solenoid pilot valve (SSPV) including a plurality of SSPV solenoids to provide a visible indication of an energization state of at least one SSPV solenoid of the plurality of SSPV solenoids of the SSPV, the SSPV including a plurality of power terminals, the plurality of power terminals configured to be coupled to separate power supplies, the plurality of SSPV solenoids electrically coupled to separate, respective power terminals of the plurality of power terminals, each SSPV solenoid of the plurality of SSPV solenoids configured to be Signed and Sealed this
Ninth Day of July, 2019

Andrei Iancu
*Director of the United States Patent and Trademark Office* energized or de-energized based on whether electrical power is supplied from an electrically coupled power terminal of the plurality of power terminals to the SSPV solenoid, the SSPV configured to actuate to permit a working fluid to pass through the SSPV to cause a control rod to be inserted into a nuclear reactor core based at least in part upon whether the plurality of SSPV solenoids are commonly energized or de-energized, the configuring including, mounting a plurality of solenoid indicator lights directly to a housing of the SSPV and electrically coupling the plurality of solenoid indicator lights to separate, respective SSPV solenoids of the plurality of SSPV solenoids and the separate, respective power terminals electrically coupled to the separate, respective SSPV solenoids, such that each separate solenoid indicator light of the plurality of solenoid indicator lights is configured to selectively activate based on whether electrical power is supplied from a separate, coupled power terminal of the plurality of power terminals to a separate, coupled SSPV solenoid of the plurality of SSPV solenoids.

Claim 7. The method of claim 6, further comprising: electrically coupling a direct current (DC) rectifier in series with one SSPV solenoid of the plurality of SSPV solenoids to one power terminal of the plurality of power terminals that is electrically coupled to the one SSPV solenoid, to configure the one SSPV solenoid to be energized via DC electrical power.

Claim 8. The method of claim 7, wherein, the one SSPV includes an instance of circuitry electrically coupled to the one SSPV solenoid of the plurality of SSPV solenoids; and the method includes configuring the SSPV to provide a visible indication of a fault state of the instance of circuitry, the configuring including mounting at least one circuit indicator light directly to the housing of the SSPV and electrically coupling the at least one circuit indicator light to the instance of circuitry, such that the at least one circuit indicator light is configured to selectively activate based at least in part upon the fault state of the instance of circuitry.

Claim 9. The method of claim 8, wherein the instance of circuitry includes an instance of voltage reduction circuitry, the instance of voltage reduction circuitry configured to reduce a voltage of DC electrical power supplied to the one SSPV solenoid.

Claim 11. A method for operating a scram solenoid pilot valve (SSPV), the method comprising: electrically coupling a plurality of SSPV solenoids included in the SSPV to separate, respective power supplies of a plurality of power supplies via separate, respective power terminals of a plurality of power terminals, such that each SSPV solenoid of the plurality of SSPV solenoids is configured to be energized or de-energized based on whether electrical power is supplied from an electrically coupled power supply of the plurality of power supplies to the SSPV solenoid via an electrically coupled power terminal of the plurality of power terminals, the SSPV is config•ured to actuate to permit a working fluid to pass through the SSPV to cause a control rod to be inserted into a nuclear reactor core based at least in part upon whether the plurality of SSPV solenoids are commonly energized or de-energized; and selectively activating a solenoid indicator light of a plurality of solenoid indicator lights mounted directly to a housing of the SSPV and electrically coupled to separate, respective SSPV solenoids and separate, respective power terminals of the plurality of power terminals that are electrically coupled to the separate, respective SSPV solenoids, the selectively activating is based on whether the electrical power is supplied from a power supply of the plurality of power supplies to a SSPV solenoid of the plurality of SSPV solenoids that 1s electrically coupled to the solenoid indicator light.

Claim 12. The method of claim 11, wherein, each solenoid indicator light of the plurality of solenoid indicator lights is electrically coupled in parallel with separate SSPV solenoids of the plurality of SSPV solenoids to separate power terminals of the plurality of power terminals; and the selectively activating the solenoid indicator light includes deactivating the solenoid indicator light in response to the SSPV solenoid becoming de-energized.